United States Patent Office 3,783,134
Patented Jan. 1, 1974

3,783,134
PROCESS FOR THE PREPARATION OF A
BITUMINOUS COMPOSITION
Lowhardt A. A. Schoen, Geleen, Netherlands, assignor to
Stamicarbon N.V., Heerlen, Netherlands
No Drawing. Filed Apr. 14, 1972, Ser. No. 244,002
Claims priority, application Netherlands, Apr. 17, 1971,
7105197
Int. Cl. C08f 45/52; C08g 51/52
U.S. Cl. 260—28
9 Claims

ABSTRACT OF THE DISCLOSURE

Polylactone-modified bitumen-ethylene based copolymer compositions and methods for their preparation are disclosed. The bitumen is a distillate of mineral oil products, the ethylene copolymer is preferably derived from ethylene and vinyl acetate and the polylactone has from 3 to 8 carbon atoms. The compositions have excellent bond strength, improved heat stability and reduced tendency to separate into two or more phases and are useful for forming molded articles, wire coatings and insulation and as adhesives in the building industry.

---

The invention relates to a process for the preparation of a bituminous composition which, besides bitumen, contains at least one ethylene-based copolymer.

In the past several methods for enabling bitumen—a product readily available in large quantities from the distillation of mineral-oil products—to be used for various industrial applications. In practice it has appeared that the range of applications of bitumen as such is only very limited owing to the rheological and mechanical properties of this material. In order to widen the range of home and industrial applications of bitumen it has been suggested to mix the bitumen with thermoplastic or rubber-like polymers; such as, compositions consisting of bitumen and a copolymer of ethylene and vinyl acetate, or bitumen-based compositions to which a copolymer of ethylene and vinyl acetate and polyisobutylene has been added, as well as compositions consisting of bitumen and a copolymer of ethylene, and other α-alkene and, optionally, one or several multiple-unsaturated compounds.

Bituminous mixtures comprising, besides bitumen, at least one ethylene-based copolymer, can be employed for a great many purposes. For example, these mixtures can be made into articles including battery containers and curbstones, as well as used for cable insulation, road surfacing material, tube coating and, in particular, as an adhesive for synthetic elastomeric roofing material. It has appeared, however, that mixtures of bitumen and at least one ethylene-based copolymer suffer from certain disadvantages including insufficient stability and a tendency to separate. The tendency is particularly noticeable at elevated temperatures and during ageing. The mixture evidently has a tendency to lose its compatibility at normal temperatures, but is especially marked at elevated temperatures. As would be apparent during production and during use or both phase separation between the bitumen and the copolymer may take place in these mixtures. Thus in the preparation of such bituminous mixtures, which is normally carried out by mixing the components at elevated temperatures, difficulties are experienced in ensuring a constant quality of the final product. Further, in use the application of these mixtures, which normally requires heating to bring them into a fluid or plastic state, widely varying results are obtained. When applied under conditions that are not controlled or are not subject to control, such as during application of the bituminous mixture as an adhesive and in particular, during its application as an adhesive in the buliding industry, conditions such as temperature and heating time are difficult to control, the tensile strength and bond strength of the mixture may deterioate considerably owing to phase separation and render the product practically useless.

The present invention provides a process for the preparation of bituminous compositions which, in addition to bitumen, contain at least one ethylene-based copolymer, the resulting product having a much lower tendency towards phase separation as with previously known products. Another object of the present invention is to provide a process for the preparation of bituminous compositions having excellent bond strength. Further advantages of the invention will be apparent from the following description. The process according to the present invention provides for the preparation of a bituminous composition in which bitumen is combined with at least one ethylene-based copolymer, is characterized in that the bitumen-copolymer composition also comprises at least one or even several polylactones. Bitumen, as uses herein, designates mixtures of hydrocarbons of natural material or pyrogeneous origin or combinations of both, frequently accompanied by their non-metallic derivatives which may be gaseous, liquid, semi-solid, or solid, and which are completely soluble in carbon disulfide. In commerce the term bitumen refers to the solid or semi-solid bitumens including, but not limited to asphalts, tars and pitches generally obtained by destructive heat action on crude oil fractions or other organic materials. See also "Encyclopedia of Chemical Technology" Kirk-Othmer, volume 2, "Asphalt," 1963, the disclosure of which is hereby incorporated by reference. This also conforms to the American Society for Testing and Materials (ASTM) definition.

According to the present invention we have now found that addition of one or several polylactones to a bitumen-ethylene copolymer mixture brings about a significant and substantial improvement in the butiminous mixtures of the type described above. It has been found, among other surprising results, that the phase separation of the bituminous mixture at elevated temperatures, a problem with the prior art, can be considerably suppressed by addition of suitable quantities of polylactones. The condition under which the bituminous mixture must be applied have thus become much less critical thus realizing an improved product as well as process economies. Further, these mixtures can, without fear of phase separation, be heated to higher temperatures, which in turn saves time in spreading them and the consequent labor expense. It has further appeared that the bond strength of those bituminous mixtures is improved by the addition of the polylactones according to the present invention.

Polylactones preferred for use according to the invention are known and are identified as those prepared by polymerization of lactones possessing a ring structure having from 3 to 8 carbon atoms, preferably having a number average molecular weight between 1,000 and 250,000. Examples of polylactones that can be used according to the present invention include the polymers of ε-caprolactone, δ-valerolactone, ω-oenantholactone and β-propiolactone. Copolymers, e.g. copolymers of two or more of the above-mentioned lactones may also be employed. Preference is given to ε-caprolactone, because this compound is relatively inexpensive and readily available, particularly to poly-ε-caprolactone having a number average molecular weight between about 10,000 and 50,000. The polylactones of the present invention can be prepared in any known manner, e.g. such as disclosed in U.S. Pats. 2,878,- 236, 2,914,556 and 2,890,208 the disclosure of which is hereby incorporated by reference. The amount of polylactone that can be incorporated in the bituminous mixture is not critical. However, it is preferred to use it in an amount of at least about 0.1 and up to 50% by weight, although greater amounts may be used. Preferably an amount of 0.1–25% by weight calculated to the total amount of bituminous mixture is chosen.

According to the present invention there may be used copolymers of ethylene and, another α-alkene and optionally, if so desired, one or more poly-unsaturated compounds, as well as copolymers of ethylene and a vinyl ester and/or a copolymerizable acrylic and/or methacrylic compounds.

The copolymers of ethylene and a vinyl ester and/or copolymerizable acrylic and/or methacrylic compounds can be prepared in the conventional manner, e.g. by h.p. polymerization at pressures above 700 atmospheres. These copolymers can also be made by polymerization in solution or aqueous dispersion at considerably lower pressures, e.g. below 400 atm.

Vinyl esters particularly suited for copolymerization with ethylene are vinyl acetate and vinyl propionate. Suited acrylic and methacrylic compounds are acrylic and methacrylic acid and the esters thereof with alkanols carrying 1–10 carbon atoms. The alkanols of these esters may be either branched or linear. The copolymers referred to above may also contain two or more comonomers such as a vinyl ester and one or several acrylic or methacrylic compounds.

The copolymers of ethylene and a vinyl ester and/or a copolymerizable acrylic and/or methacrylic compound may contain 0.5 to 50% by weight of comonomers. However, preference is given to comonomers containing 1–30% by weight of comonomer in addition to ethylene.

The copolymers of ethylene, at least one other α-alkene having from 3 to 8 carbon atoms such as propylene and butene, and, if so desired, one or several poly-unsaturated compounds according to the invention can be prepared with the aid of a coordination catalyst made by combining at least one compound of a metal of the subgroups 4–6 or 8 of the periodic system, including thorium and uranium, with a metal, or a compound of a metal, of the groups 1–3 of the 4th main group of the periodic system. The presence of other substances, such as slight quantities of compounds with free electron pairs, like water, alcohols, oxygen and Lewis bases, is not objectionable. Examples of poly-unsaturated monomers are hexadiene-1,4, dicyclopentadiene, 5-vinylnorbornene-2, 5-ethylidenenorbornene-2, 5 - methylenenorbornene-2, 5-(2-propenyl)norbornene-2, 5-(5-hexenyl)norbornene-2, 4,7,8,9-tetrahydro - indene and isopropylidene tetrahydroindene. The copolymers of ethylene, α-alkene and poly-unsaturated compounds can be prepared according to any known process e.g. as described in U.S. Pats. 3,300,459 and 3,211,709 the disclosure of which is hereby incorporated by reference.

The copolymers of ethylene, at least one other α-alkene and, if so desired, one or more poly-unsaturated compounds are normally prepared by polymerization in a dispersion, medium that is inert towards the catalyst, such as butane, pentane, hexane or mineral-oil fractions, aromatic hydrocarbons, such as benzene or toluene, or halogenated aliphatic or aromatic hydrocarbons, such as tetracarbon chloride.

It is also possible to perform the polymerization under temperature and pressure conditions where one or several of the monomers used, notably the α-alkene such as propylene, is a liquid and occurs in so large a quantity as to act as dispersion medium.

The ethylene copolymers in the bituminous compositions according to the present invention can be used in quantities of between about 0.5 and about 50% by weight, although even greater quantities can be used; however preferred are quantities of between about 1 and about 30% by weight.

The bitumens employed in the bituminous compositions can be obtained as residue in the distillation of mineral oil. The bitumen is prepared in a variety of known ways, for instance starting from distillation under normal pressure, high vacuum distillation or a blowing procedure may also be used. The bitumens, as hereinbefore characterized, preferably used in the bituminous compositions according to the invention possess a penetration of 1–200 mm., preferably of 1–50 mm., as measured at 25° C. according to ASTM–D 5. The softening temperature of the bitumens used, measured by the ring-and-ball test in conformity with ASTM–D 36, normally lies above about 25° C. It is preferred to use a bitumen with a softening temperature of between about 25 and about 200° C. although somewhat higher and lower values are acceptable. The new bituminous compositions can be conveniently prepared in the conventional manner by mixing bitumen, copolymers of ethylene and further components in customary mixing installations like stirred vessels, kneaders, extruders and mills.

In addition to bitumen and at least one ethylene-based copolymer, the new bituminous compositions may contain conventional fillers such as carbon black, kieselguhr, kaolin, quartz powder, glass fiber and stone grit, among others; these give an increase in mechanical strength and elasticity. The new bituminous compositions may further contain one or several organic materials, such as polymers of alkenes or alkadienes, for example polyisoprene and polyisobutylene depending upon the intended use for the bitumen-copolymer-polylactone products. It may also be advantageous to admix the bituminous compositions according to the present invention with one or more coal-tar resins or petroleum resin, such as a coumarone-indene resin, to increase the tensile strength of the product at elevated temperatures.

The new bituminous compositions may be employed for production of molded articles, and as a corrosion preventive on all manner of objects conveniently by immersing the object to be coated in the molten composition. The compositions may also be used as tube and tank coating, as a sealing agent in joints and seams and as road-surfacing material. Additional applications for the new bituminous compositions will be apparent to one skilled in the art. Further, the bituminous compositions according to the present invention are particularly suited as adhesives, notably as adhesives for applying synthetic elastomer sheeting on roofs.

The compositions of the present invention depending upon the materials and additives contained therein, are mixed together generally within a temperature range of about 100 to about 300° C.

The order of mixing the various ingredients of the composition is not critical and may be done in any expedient manner; preference is given, however, to first mixing the bitumen and ethylene copolymer components and thereafter admixing the polylactone for components.

The following non-limiting examples will further illustrate the present invention. Unless otherwise indicated all parts and percentages are by weight.

EXAMPLE 1

A bituminous composition was prepared by mixing 78 parts of bitumen, 22 parts of a copolymer made of ethylene and vinyl acetate, and 5 parts of polycaprolactone, all in parts by weight. The bitumen used had a penetration of 5 mm. at 25° C. and a softening point (ball and ring test) at 75° C. The ethylene vinyl acetate copolymer had a melt index of 2.5 and vinyl content of 18% by weight.

The polycaprolactone used was a commercial product with a number average molecular weight of 15,000, commercially available as PCL 300 manufactured by Union Carbide Corp. The polycaprolactone was admixed with the bitumen-ethylene vinyl acetate copolymer mixture by stirring it in a mixer for 2 hours at 200° C. (stirrer speed: 80 r.p.m.).

The above-metioned bituminous composition according to the invention was compared with a composition of the same quantities of bitumen and copolymer prepared in a similar manner but without the addition of polycaprolactone. Samples taken from the two compositions were heated at a rate of 5° C. per minute. The behavior of the two samples throughout the heating period was examined under a microscope (enlargement: 130×).

The sample A not prepared according to the invention, that is, without addition of polylactone, exhibited the following behavior during heating: up to 10° C. the distribution of the components did not change. At 105° C. a slight separation set in, which manifested itself in the formation of minute bitumen drops. Between 105 and 225° C. larger bitumen drops formed, which gradually grew in size. Phase separation became very evident. After the temperature had been increased to 225° C. the sample was cooled to room temperature, and thereafter re-examined It appeared that cooling had not improved the distribution of the two components in the mass to any noticeable extent. The phase separation caused by the heat treatment persisted.

The sample 1 according to the present invention including the polylactone showed the following behavior during heating: up to 100° C. the distribution of the components in the mass remained unchanged. At 125° C. a slight phase separation occurred and exuded bitumen drops were clearly observed. Between 125 and 1250° C. the formation of bitumen drops in the mass increased. In these bitumen drops polycaprolactone globules could be distinguished. Between 150 and 225° C. the formation of bitumen drops increased until the polycaprolactone drops burst, causing the bitumen to be smeared out over the entire mass. At the same time the polycaprolactone disappeared into the melt of the ethylene-vinyl acetate copolymer. At 225° C. bitumen droplets were hardly observed any more. Upon cooling, the bituminous mass did not show any signs of phase separation and the mixture was observed to remain homogeneous or nearly so.

This experiment was repeated using compositions containing a copolymer of ethyelne, propylene and discyclopentadiene instead of an ethylene-vinyl acetate copolymer. It was found that addition of polycaprolactone produced an identical effect.

EXAMPLE 2

A bituminous composition was prepared as described in Example 1. The composition contained 78 parts of bitumen, 22 parts of an ethylene-vinyl acetate copolymer as described in Example 1 and 5 parts of a polycaprolactone, all in parts by weight and designated as adhesive 2. Further, a similar composition was prepared but without the addition of a polylactone and designated as adhesive B.

Two films consisting of a copolymer of ethylene, propylene and a multiple-unsaturated compound and having a thickness of 1.5 mm. were bonded together by means of adhesives B and 2, and heated for two minutes on a plate maintained at a temperature of 190° C., and thereafter they were kept at 20° C. for one hour. The thickness of the adhesive layer between both films was 0.5 mm.

The bonded films were then cut into test specimens of 250 mm. length and 25 mm. width, whereupon we determined what force, acting perpendicularly to the joined portions, the strips, was necessary to draw the films apart at the rate of 5 cm./minute. The results found are given below:

| Composition of the adhesive | Peeling-off force in kgs. per 2.5 cm. after— | |
|---|---|---|
| | 5 hrs. at 20° C. | 24 hrs. at 20° C. |
| B—bitumen plus EVA copolymer | 5.6 | 3.9 |
| 2—bitumen plus EVA copolymer plus 5 parts by weight of polycaprolactone, M=15,000 | 4.8 | 5.3 |

Note the decrease in peeling-off force needed for the bitumen EVA mixture. Although we are not entirely certain as to the theory involved, an explanation may be that in bonds made with this mixture some degree of phase separation takes place over a period of time, with the result that the bonding strength continues to decrease in relation to time. In the bituminous mixtures according to the present invention a different process takes place. Evidently the homogeneity of the mixture in the adhesive layer improves with time.

Although less dramatic results may be expected, the lactone-modified adhesives of the present invention can be used with advantage in bonding other types of polymeric films such as polyvinyl chloride, polyethylene, polypropylene, 4-methylpentene-1 and the like. Similarly such adhesives may be applied to cellulosic derivatives such as paper, cellophane and similar materials. It of course, will be apparent that variations in the ratio of bitumen, ethylene copolymer and polylactone, when with the bonds of ingredients as previously indicated, also results in a highly acceptable product.

I claim:

1. Process for the preparation of a bituminous composition comprising admixing (a) bitumen; (b) a copolymer of ethylene with at least one copolymerizable vinylester and/or acrylic or methacrylic acid and/or esters thereof with alkanols carrying 1–10 carbon atoms, present in an amount from about 0.5 to about 50 weight percent of the total quantity of the resulting mixture and/or (c) a copolymer of ethylene, at least one other α-alkene having from 3 to 8 carbon atoms and optionally one or several poly-unsaturated compounds present in an amount from about 0.5 to about 50 weight percent of the total quantity of the resulting mixture; and (d) at least a polylactone, prepared from a lactone with a ring structure carrying from 3 to no greater than 8 carbon atoms having a number average molecular weight of between about 1,000 and 250,000, and present in an amount from about 0.1 to about 50 weight percent of the total quantity of the resulting mixture, said bituminous composition having improved heat stability and a reduced tendency to separate into two or more phases.

2. Process according to claim 1 wherein the polylactone component (d) is polycaprolactone.

3. Process according to claim 1 wherein the polylactone component (d) is polycaprolactone having a number average molecular weight of between about 10,000 and 50,000.

4. Process according to claim 1 wherein the ethylene copolymer (b) is a copolymer of ethylene and a vinyl ester.

5. Process according to claim 1 wherein the ethylene copolymer component (b) is a copolymer of ethylene and vinyl acetate having a vinyl acetate content from about 1 to 30 percent by weight.

6. Process according to claim 1 wherein the amount of the polylactone component (d) is between about 0.1 and 25 weight percent.

7. Process according to claim 1 wherein the amount of the ethylene component (b) and/or (c) is between about 1.0 and 30 weight percent.

8. In a process for the preparation of a bituminous composition comprising admixing (a) bitumen; (b) from about 0.5 to about 50 weight percent, based on the total quantity of the resulting mixture, of a copolymer of ethylene with at least one copolymerizable vinylester, and/or acrylic-or methacrylic acid and/or esters thereof with alkanols carrying 1–10 carbon atoms and/or (c) from about 0.5 to about 50 weight percent ofa copolymer of ethylene, at least one other α-alkene having from 3 to 8 carbon atoms and optionally one or several poly-unsaturated compounds; the improvement comprising adding from at least 0.1 to 50 weight percent of at least one polylactone prepared from a lactone with a ring structure carrying from 3 to no greater than 8 carbon atoms and having a number average molecular weight of between about 1,000 and 250,000, the resulting bituminous composition having improved heat stability and a reduced tendency to separate into two or more phases.

9. A bituminous composition having improved heat stability and a reduced tendency to separate into two or more phases comprising bitumen, from about 0.5 to about 50 weight percent, based on the total weight of said composition, of at least a copolymer of ethylene with at least one copolymerizable vinyl ester, and/or acrylic or methacrylic acid and/or esters thereof with alkanols carrying from 1–10 carbon atoms and/or copolymers of ethylene, from about 0.5 to about 50 weight of at least one other α-alkene having from 3 to 8 carbon atoms and optionally one or several poly-unsaturated compounds; and from about 0.1 to about 50 weight percent of at least one polylactone prepared from a lactone with a ring structure carrying from 3 to no greater than 8 carbon atoms and having a number average molecular weight between about 1,000 and 250,000.

References Cited
UNITED STATES PATENTS

| | | | |
|---|---|---|---|
| 3,303,149 | 2/1967 | Fink | 260—28.5 AV |
| 3,336,252 | 8/1967 | Raichle et al. | 260—28.5 AV |
| 3,344,101 | 9/1967 | Roedig | 260—28.5 AV |
| 3,423,342 | 1/1969 | Kendall | 260—28.5 AV |
| 3,576,778 | 4/1971 | Davis | 260—28 |
| 2,878,236 | 3/1959 | Young et al. | 260—899 |
| 2,890,208 | 6/1959 | Young et al. | 260—886 |
| 2,914,556 | 11/1959 | Hostettler | 260—899 |

ALLAN LIEBERMAN, Primary Examiner

S. L. FOX, Assistant Examiner

U.S. Cl. X.R.

260—28.5 A, 28.5 AV